(12) United States Patent
Sinai et al.

(10) Patent No.: US 9,230,037 B2
(45) Date of Patent: Jan. 5, 2016

(54) IDENTIFYING AND RESOLVING CACHE POISONING

(71) Applicants: Eyal Sinai, Kfar Saba (IL); Or Igelka, Ramat Gam (IL)

(72) Inventors: Eyal Sinai, Kfar Saba (IL); Or Igelka, Ramat Gam (IL)

(73) Assignee: SAP SE, Walldorf (DE)

( * ) Notice: Subject to any disclaimer, the term of this patent is extended or adjusted under 35 U.S.C. 154(b) by 336 days.

(21) Appl. No.: 13/743,043

(22) Filed: Jan. 16, 2013

(65) Prior Publication Data

US 2014/0201457 A1 Jul. 17, 2014

(51) Int. Cl.
*G06F 17/30* (2006.01)
*G06F 12/12* (2006.01)

(52) U.S. Cl.
CPC ........ *G06F 17/30902* (2013.01); *G06F 12/121* (2013.01)

(58) Field of Classification Search
CPC .............. G06F 11/073; G06F 11/0793; G06F 12/0802; G06F 12/121; G06F 12/127; G06F 21/00; G06F 11/141; G06F 12/0804; G06F 12/0811; G06F 12/0815; G06F 12/0866; G06F 12/0868; G06F 12/0897; G06F 12/12; G06F 12/123; G06F 12/126
USPC .......... 711/118, 119, 134, E12.001, E12.017, 711/E12.023, E12.043, E12.069; 709/212, 709/214–219

See application file for complete search history.

(56) References Cited

U.S. PATENT DOCUMENTS

| | | | |
|---|---|---|---|
| 6,014,756 A | 1/2000 | Dottling et al. | |
| 6,393,399 B1 | 5/2002 | Even | |
| 7,421,562 B2 | 9/2008 | Bhatt et al. | |
| 7,471,684 B2 | 12/2008 | Finley et al. | |
| 7,480,767 B2 | 1/2009 | Moser | |
| 7,590,803 B2 | 9/2009 | Wintergerst | |
| 7,930,428 B2 | 4/2011 | Drako | |
| 8,001,271 B1 | 8/2011 | Malan et al. | |
| 8,095,831 B2 | 1/2012 | Moyer et al. | |
| 8,190,951 B2 | 5/2012 | Gille | |
| 2004/0068579 A1* | 4/2004 | Marmigere et al. | 709/242 |
| 2006/0209818 A1 | 9/2006 | Purser | |
| 2008/0228899 A1* | 9/2008 | Plamondon | 709/219 |
| 2008/0229025 A1* | 9/2008 | Plamondon | 711/126 |
| 2011/0066807 A1 | 3/2011 | Hay et al. | |
| 2012/0180125 A1 | 7/2012 | Sun et al. | |
| 2013/0198338 A1 | 8/2013 | Pinto et al. | |
| 2013/0318055 A1 | 11/2013 | Lorenz et al. | |

* cited by examiner

*Primary Examiner* — Zhuo H Li

(74) *Attorney, Agent, or Firm* — Buckley, Maschoff & Talwalkar LLC

(57) ABSTRACT

According to some embodiments, a method and apparatus are provided to receive, at a cache entity, a refresh request associated with a resource. A determination is made, via a processor, and based on the refresh request, to reload the resource from a server. The reloaded resource is replaced at the cache entity.

20 Claims, 7 Drawing Sheets

| Resource ID 502 | Current Reliability 504 | Max Allowable Level 506 | Starting Reliability 508 |
|---|---|---|---|
| 1 | 43 | 50 | 0 |
| 2 | 19 | 30 | 0 |
| 3 | 40 | 50 | 40 |
| 4 | 35 | 75 | 0 |

IDENTIFYING AND RESOLVING CACHE POISONING

BACKGROUND

A web cache saves resources of various types from one or more web servers and provides these resources to clients when a request for the resource is received. When a client sends a request for a specific resource, the request is received at the web cache and the cache checks whether it already has a copy of the requested resource stored in its storage and determines whether the copy of the resource has or has not expired. If the copy of the requested resource is available and has not expired, then the web cache sends a response to the requesting client with this stored copy of the resource, without communicating with the original server which holds this resource.

The advantages of caching are that by receiving the requested resource from the cache, the client gets a faster response to his request, network traffic is reduced, and the load on the web server supplying the resource is reduced.

Sometimes, however, a web server may provide an incorrect or incomplete copy of the resource to the web cache (i.e., "poisoned" the cache). Furthermore, in some embodiments a cache may be poisoned by a cache simply becoming defective, and thus the copies of the resources stored within the cache are also defective. Thereafter, clients who request the resource will get an incorrect or incomplete copy in response to their request. While the incorrect or incomplete resource copy may be quickly remedied on the web server, the web cache may still store the incorrect or incomplete copy of the resource. Since cached resources are associated with a time out period (e.g., expiration time), conventional remedies involve waiting until the time out period of the cached resource has expired and then the web cache will evacuate the previously stored copy of the resource by itself. However, until the time out period ends, users will be unable to obtain the desired resources from the web server, unless an administrator will manually clean up the cache, usually the entire cache (which would cause performance degradation, since "good" resources are deleted as well).

BRIEF DESCRIPTION OF THE DRAWINGS

FIG. 5 illustrates a portion of a database according to some embodiments.

DETAILED DESCRIPTION

The present embodiments relate to a method and apparatus to identify and resolve situations when a cache has been poisoned with incorrect or incomplete information. Cache Poisoning may comprise a cache that has stored a defective copy of a resource in its storage (e.g., incorrect or incomplete). Cache poisoning may be the result of a cache sending a request for a copy of a resource to a server, and the server replies with a defective response. The cache may consider this response as valid without knowing that it's defective and then the cache responds with the defective resource when a request from a client is received for the duration in which the resource reside in the cache (instead of making it a one time error).

A user, on the other hand, may notice that there is a problem with a resource and may click "refresh" in his browser or any other HTTP client, or any similar "refresh" action (e.g., ctrl+r/F5 key/ctrl+F5), in hopes that by refreshing, a fixed (e.g., repaired) version of the resource will be loaded from the server. A client may comprise any entity which can request resources from a server and/or a cache such as, but not limited to, an internet browser, a computerized utility, computer software, a dedicated hardware appliance, an automatically/manually activated computer script/program etc.

Figure 1:
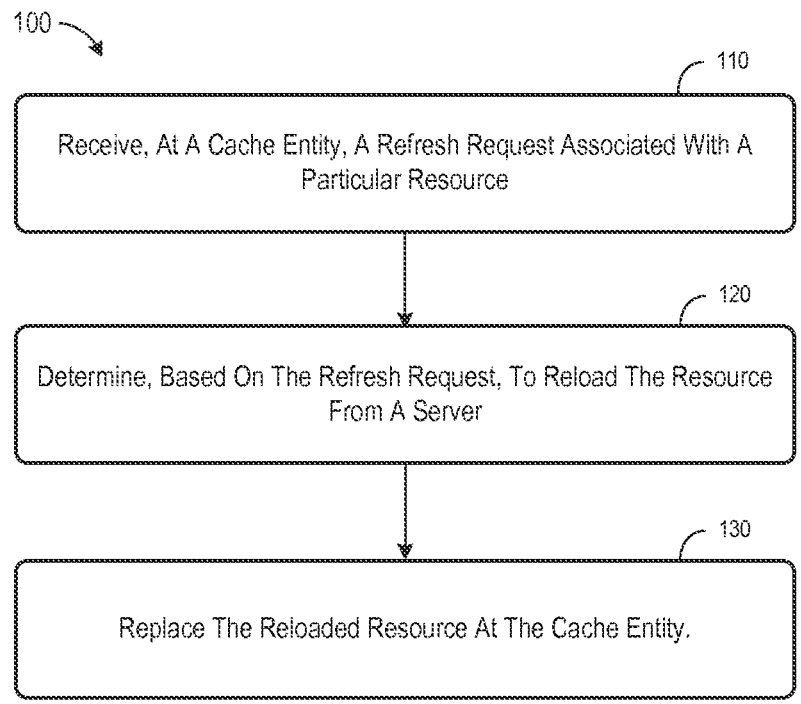
FIG. 1 illustrates a method according to some embodiments.

Referring now to FIG. 1, an embodiment of a method 100 is illustrated. The method 100 may be embodied on a non-transitory computer-readable medium. Furthermore, the method 100 may be performed by an apparatus such as, but not limited to, the apparatus of FIG. 7. The method 100 may be associated with identifying and resolving cache poisoning.

At 110, a refresh request associated with a particular resource may be received at a cache entity. A refresh request may comprise sending a message to a server requesting that a particular resource be reloaded. In some embodiments, a resource may comprise, but is not limited to, a web page, an image file, a sound file, a video file, a document file, or any other type of data (or a portion of data) which may be used by a processor and/or stored on a computer. A cache entity may comprise an entity which stores resources being passed through it where a copy of the resource is stored in the entity's storage. A cache entity may comprise, but is not limited to, a web cache, an internet browser cache, a proxy server, an in-memory cache, software/hardware cache, a processor's cache, a dedicated hardware and/or software appliance, or a cache system (as will later be described) that may be located between a server and a client.

Figure 3:
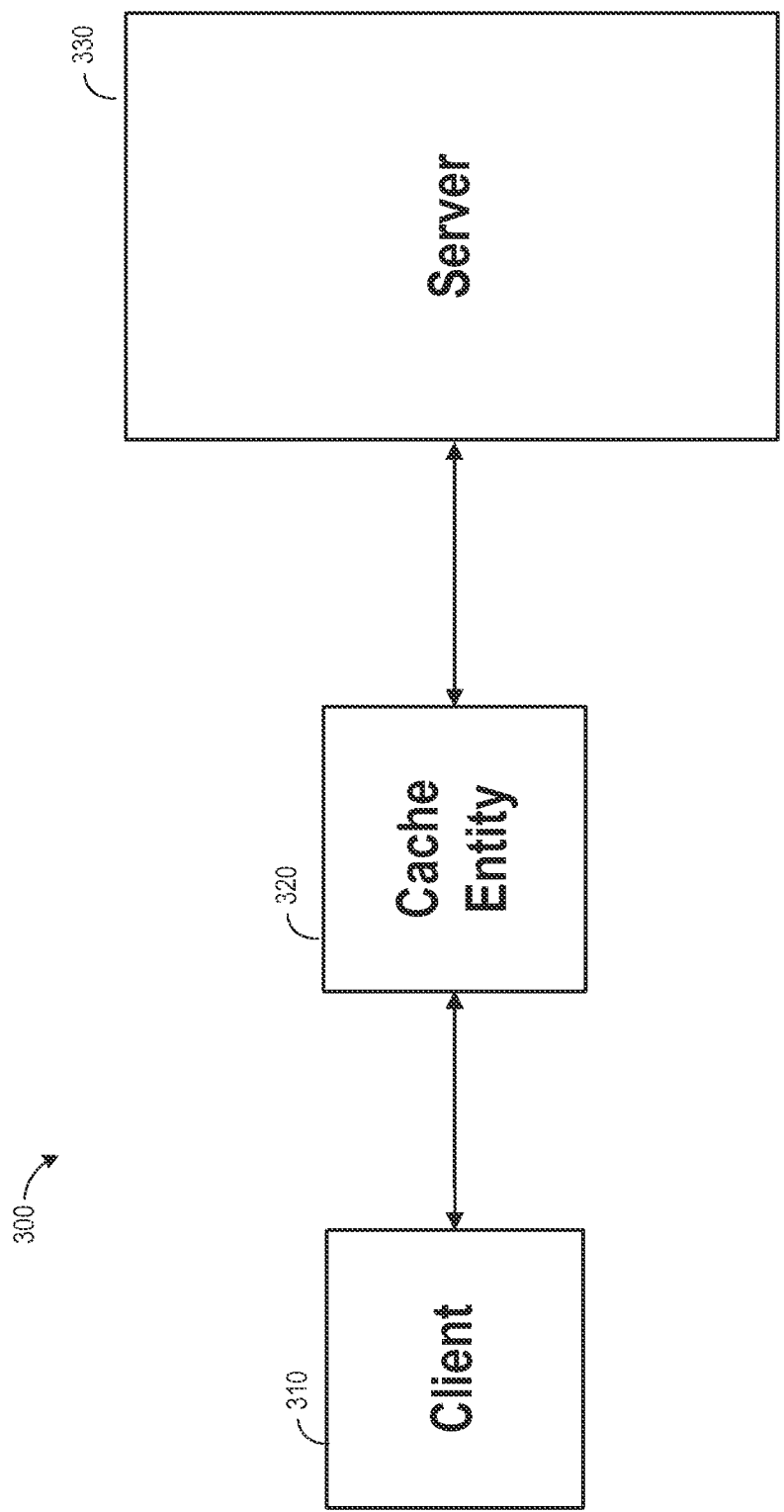
FIG. 3 illustrates a system according to some embodiments.

For illustrative purposes, and to aid in understanding features of the specification, some examples will be introduced. These examples are not intended to limit the scope of the claims. In a first example, and referring to FIG. 3, a system 300 illustrates a first client 310, which wishes to view an image on web page X. Web page X is hosted on server 330. In this example, the first client 310 receives only half of the image (e.g., a defective image) when he retrieves web page X from a cache entity 320. The first client 310 sends a refresh request (e.g., a user hits the refresh button on his web browser and his computer sends a refresh request) which is received by the cache entity 320. If, for example, the cache entity 320 is a web cache then the client may be a web browser or a person using their web browser. In this example, the refresh request may comprise a Hypertext Transfer Protocol ("HTTP") GET request for the image on web page X.

Referring back to FIG. 1, at 120, a determination to reload the resource from a server is made based on the refresh request. Reloading the resource may comprise copying the resource from a server to the cache entity. The determination may be made by a processor, such as the processor described with respect to FIG. 7. The determination may be made based on various rules. In one embodiment, the determination to reload the resource from the server may be based on receiving X number of refresh requests from Y number of users. For example, a refresh rule may be that a resource is reloaded after three refresh requests are received from three unique users. Embodiments such as this may indicate to the cache entity that the user community has noticed a problem with the resource and this indication may influence the logic of the cache entity to remedy the problem. In another embodiment, the reload may be based on a reliability level associated with a server that supplies the resource, which will be explained in more detail with respect to FIG. 2.

The cache entity may determine that a received request is a refresh request by examining the header information associated with the request (e.g., a HTTP GET request) which may contain information (e.g., a field) that indicates that the present request is a refresh/re-get request as opposed to an initial HTTP GET request. In some embodiments, each type of web browser may add its own HTTP headers, or fields, to a request to indicate a refresh action (e.g., Microsoft Internet Explorer®, Google Chrome®, Mozilla Firefox®, Apple Safari® and Opera® by Opera Software). In this way, the caching entity may be capable of identifying unique requests, and, for example, when 3 such requests arrive for the same resource, the cache entity may understand that there's a problem with this resource, and will resample the server to get an updated and/or a fixed version/copy of the requested resource.

Continuing with the first example, and again referring to FIG. 3, the cache entity 320 may determine whether or not to reload the resource from the server 330 based on the refresh request. For example, if we use the aforementioned rule of three refresh requests being received from three unique clients, the cache entity 320 may determine if the refresh is a third request from a third entity (e.g., a third unique client) and, if true, then the cache entity will reload the resource form the server 330. If false, then the cache entity will not reload the resource from the server 330.

Next, at 130, the reloaded resource is replaced at the cache entity. Continuing again with the above example, and assuming that the request was a third request from a third unique entity, the picture that was only half loaded will be reloaded from the server 330 into the cache entity 320 as a complete picture.

Figure 2:
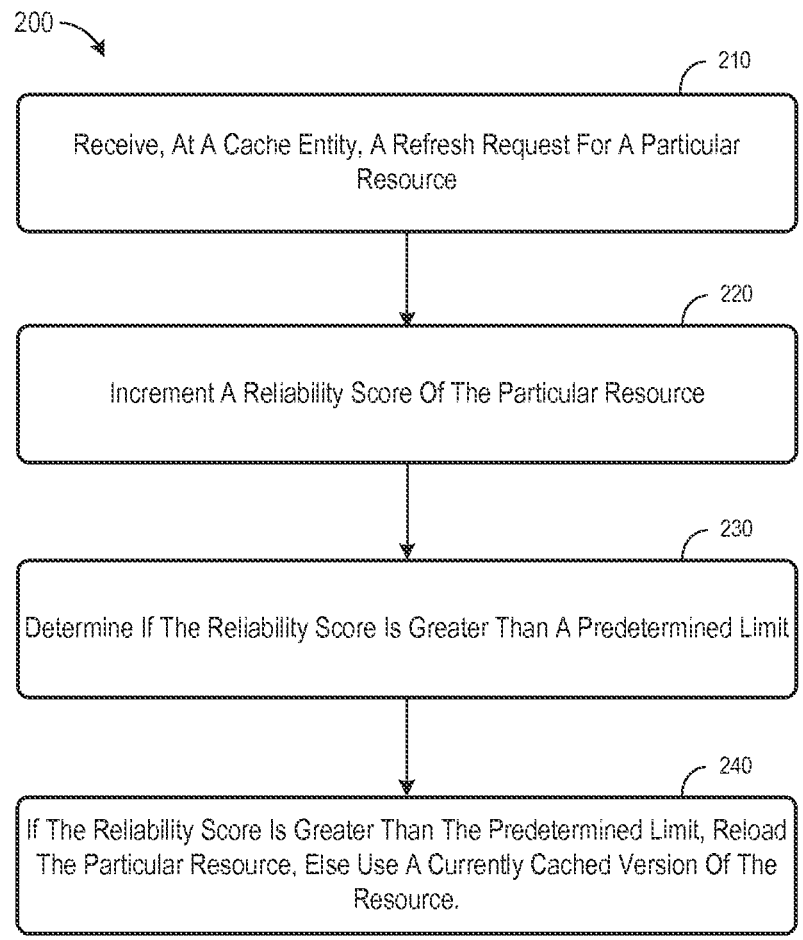
FIG. 2 illustrates a method according to some embodiments.

Referring now to FIG. 2, an embodiment of a method 200 is illustrated. The method 200 may be related to reloading a resource from a server into a cache entity based on reliability levels of the resource and/or the server. Like the method 100 associated with FIG. 1, the method 200 also relates to reloading the resource in a cache entity based on a received refresh request. At 210, a refresh request for a particular resource is received at a cache entity. Like the method 100, the refresh request may be in the form of an HTTP GET, or other unique actions.

Figure 4:
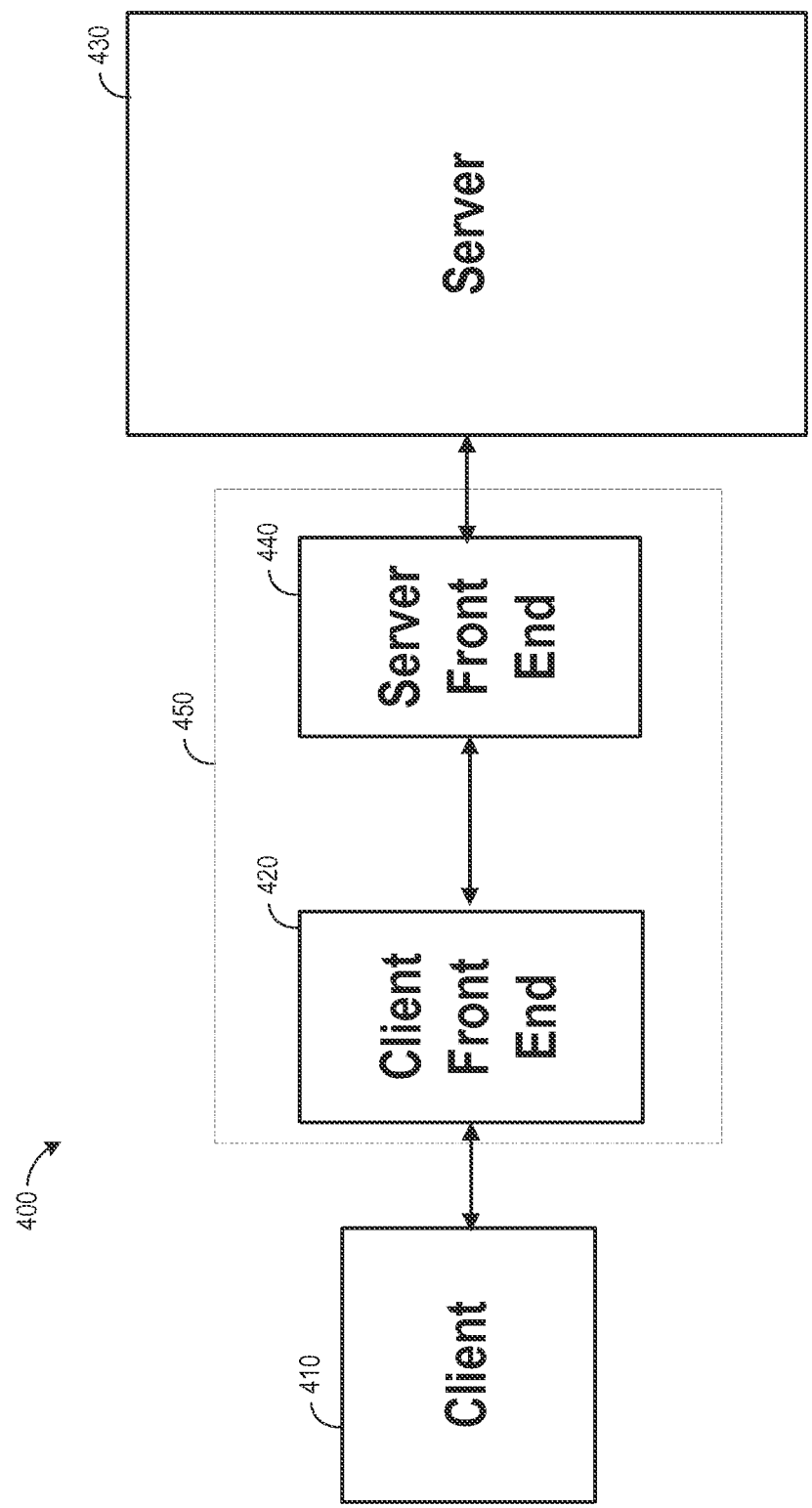
FIG. 4 illustrates a system according to some embodiments.

In a second example, and now referring to FIG. 4, a system 400 illustrates a second client 410 who wishes to view a news web page Y from server 430. In this example, the second client 410 receives a non-news website (e.g., the wrong web page) when he retrieves web page Y from a cache entity 450. The second client 410 sends a refresh request which is received by the cache entity 450. Specifically, the refresh request is received at a client front end 420 of the cache entity 450. The client front end 420 may comprise a proxy server or other type of cache entity. In this example, the cache entity 450 may comprise multiple cache entities such as the previously mentioned client front end 420 as well as a server front end 440 to receive and store a resource from the server. In practice, the server 430 may send a copy of a resource to the server front end 440 where the copy of the resource is stored in a cache at the server front end 440. The server front end 440 may forward the cached resource to the client front end 420 where it is stored and can later be presented to the second client 410.

Referring back to FIG. 2, at 220 a reliability score of the resource is incremented. In some embodiments, a server and/or resource stored at the server is given a reliability score (e.g., 0-100) by the cache entity. For purposes of explanation, a lower reliability score will be considered a more reliable score. However, the present embodiments may also be implemented using a reliability score where a higher score is considered more reliable. Each resource, and each of its associated servers (a resource may be located on multiple parallel servers such as backup servers), may each have their own reliability score (e.g., between 0-100).

The caching entity may assign an initial reliability score to each resource originating from a server. The reliability score may be based on the server's credibility (e.g., known uptime or down times associated with the server) and/or based on the resource's content. For example, if the server being cached is associated with a known banking system, which is very reliable, the resource's reliability score may be 0. In another example, if a retrieved resource from a particular server is a low-quality picture it may be given a reliability score of 30 due to a lack of redundancy of information within the file (e.g., the low quality picture) for self-correction or self-fixing. Furthermore, if the low-quality picture came from a suspicious/unstable server which has a ranking of 40, the initial reliability score of the resource would be 30+40=70. (e.g., the reliability score of the resource added to the reliability score of the server)

A cache entity may raise a reliability score of a resource based on unique actions of a client associated with a caching entity. The caching entity may initially assign each client a refresh increment of 1. In other words, when a client performs a unique action (e.g., an action that indicates a problem with the resource), such as, but not limited to a refresh request, the caching entity may raise the resource's reliability score by the client's increment amount (e.g., 1). Thus, if there were 10 refresh actions associated with a given resource (either from a single client, or a single refresh action from ten different clients), then the reliability score of the resource would rise by 10. If we use the previous example where the reliability score was 70, the 10 refresh actions would raise the reliability score to 80.

At 230, a determination if the reliability score is greater than a predetermined limit is made. Each resource, and each of its associated servers, may have not only their own reliability score (e.g., between 0-100), but also a red line score (e.g., an upper limit) in the same range (e.g., between 0-100). If a current reliability score associated with the resource, or server, goes beyond its red line score, the caching entity may resample the server that provided this resource. For example, a caching entity may decide that its red line score for the low-resolution image mentioned above is 80 (or a user may determine a preset level for images in general). Thereafter, the cache entity may save this low-resolution image resource as valid until the reliability score of the resource rises from 70 to above 80.

At 240, if the reliability score is greater than the predetermined limit then the particular resource is reloaded. Else, a currently cashed version of the particular resource is used.

In some embodiments, if the resource's expiration date/time arrives before the reliability score goes above the red line score, the caching entity would resample the resource from the server upon a next client request for the resource or upon a decision of the caching entity without client intervention (e.g., an active pre-fetching mechanism in the caching entity). In some embodiments, the caching entity may learn from previous usage of the resource and thus a reliability score and a statistical popularity of a resource may be used by the caching entity to fine tune its pre-fetching mechanism (e.g., if a resource is very popular and is reaching close to its red line, the caching entity's pre-fetching mechanism may want to resample the server for it, even without a client's request for it, assuming this resource would soon be requested again by clients). The present embodiments may facilitate curing of cache poisoning by the use of feedback from the user community before conventional time-out periods occur. In some embodiments, when requesting a web page, the web page itself is a resource which may also comprise and/or refer to several other resources (e.g., pictures, documents, videos, sounds etc.). The web page may be parsed to store and/or refer to each of the resources associated with the web page.

Therefore, if a user sends a refresh request for a web page, a cache entity may analyze the web page to understand which resources it includes and/or refers to (since the user doesn't necessarily ask to refresh a specific component and/or resource which may be part of the web page and/or is referred to by the web page). Once the cache entity determines which resources are associated with the web page, it may increase each of their Reliability Scores accordingly (and in some embodiments, with different weights for each one as well).

Accordingly, analysis of a refresh action may rely not only on the existence of the refresh action itself, but rather also analyze the refresh action, since the HTTP headers of further HTTP GET requests which may follow a web page's refresh request for example, might not contain the "refresh" field, even though they are a direct cause of the user's web browser trying to reload the whole web page, which may be a resource as itself that contains and/or refers to other resources as well.

Figure 6:
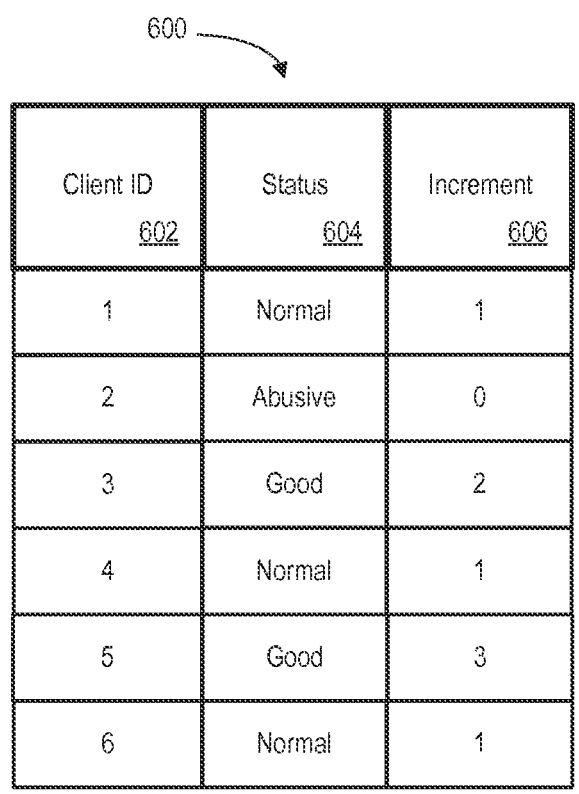
FIG. 6 illustrates a portion of a database according to some embodiments.

Now referring to FIGS. 5 and 6, a caching entity may further maintain its information regarding a resource, a server and client reliability. In other words, a caching entity may update its initial reliability score that is given to a server and/or a resource based on a quality of the resource or a response of the server. For example, if a server returns a lot of corrupt responses, its initial reliability score would raise. In response to a rising reliability score, a cache entity may decide to switch which server it uses to get a particular resource in order to fulfill a client's request (assuming there are backup servers).

Furthermore, a cache entity may also update a resource's current reliability score or red line score based on statistics it gathers, for example, if the resource is requested many times by clients, and there are no unique actions from the clients' side indicating any error, the caching entity may assume the resource is valid, and set its grade to a lower one, or raise its red line score. As illustrated in FIG. 5, a cache entity may store a table 500 (which may be a portion of a database) that stores a resource ID 502 (e.g., a unique identifier for a resource), a current reliability score 504 of the resource, a red line score 506 (e.g. a maximum allowable level) and a default or starting reliability score 508 for each resource.

The cache entity may also track client increment amounts as well as a status of each client. In one embodiment, clients may be grouped into Normal, Good, or Abusive. Each client may default to be "Normal" and have a client increment amount of 1.

Abusive clients may be clients that refresh some resource in an endless loop (or greater than a predetermined number of refreshes for a predetermined time period), no matter whether the resource is valid or defective. In order to defend itself from raising a particular resource's reliability score for no good reason due to this abusive client's refresh actions, a cache entity may mark this client as abusive and ignore such clients by lowering their client increment amount to below 1 (or even to 0) so that their unique actions won't affect the resources' reliability score.

On the contrary, if a client performed a contributing refresh action (e.g., detected a truly defective resource and reported it to the caching entity), which may have caused the caching entity to resample this resource from the server due to this client's unique action, the client may be marked as "Good". A "Good" client may have a client increment amount that is greater than 1 (e.g., 2 or 3). This indicates that this specific client is beneficial to the caching entity's performance. FIG. 6 relates to a relational table 600 that illustrates one embodiment of how a cache entity may track a Client ID 602 and its associated status 604 and increment 606. By assigning an increment to each client, each received refresh request may be weighted based on the increment 606 of the client transmitting the received refresh request, identified by its Client ID 602. The status 604 may function like a red/yellow/green marker according to the client's increment 606. The increment 606 may comprise a weight that the user may have on a resource's reliability level. Moreover, the reliability level of a resource may decrease (e.g., if it's more reliable) if, for example, seven "Good" clients did not refresh a resource, where this decision may also be based on the clients' increment, and the amount of reduction of the reliability level itself may also be based on the clients' weights (e.g., increments or in this case, decrements).

Figure 7:
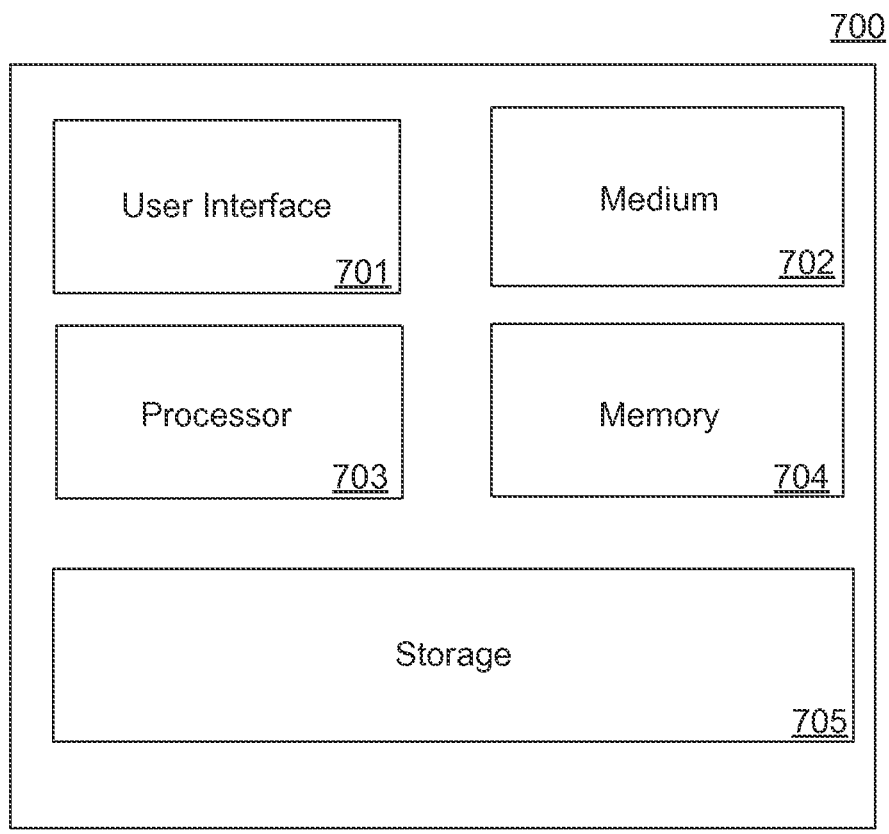
FIG. 7 illustrates an apparatus according to some embodiments.

Now referring to FIG. 7, an embodiment of an apparatus 700 is illustrated. According to some embodiments, the apparatus 700 may relate to a cache entity. The apparatus 700 may comprise a user interface 701, a medium 702, a processor 703, a main memory 704, and a storage device 705. According to some embodiments, the apparatus 700 may further comprise a digital display port, such as a port adapted to be coupled to a digital computer monitor, television, portable display screen, or the like.

The user interface 701 may allow users to interact with the apparatus 700 using text commands or with images/graphical icons. In some embodiments, the user interface may comprise a keyboard, mouse, or associated port related thereto. Furthermore, the user interface 701 may comprise a display or a touch screen.

The medium 702 may comprise any computer-readable medium that may store processor-executable instructions to be executed by the processor 703. For example, the medium 702 may comprise a non-transitory tangible medium such as, but is not limited to, a compact disk, a digital video disk, flash memory, optical storage, random access memory, read only memory, or magnetic media.

A program may be stored in a compressed, uncompelled and/or encrypted format. The program may furthermore include other program elements, such as an operating system, a database management system, and/or device drivers used by the processor 703 to interface with peripheral devices.

The processor 703 may include or otherwise be associated with dedicated registers, stacks, queues, etc. that are used to execute program code and/or one or more of these elements may be shared there between. In some embodiments, the processor 703 may comprise an integrated circuit. In some embodiments, the processor 703 may comprise circuitry to perform a method such as, but not limited to, the method described with respect to FIG. 1.

The processor 703 communicates with the storage device 705. The storage device 705 may comprise any appropriate information storage device, including combinations of magnetic storage devices (e.g., a hard disk drive), optical storage devices, flash drives, and/or semiconductor memory devices.

The storage device 705 stores a program for controlling the processor 703. The processor 703 performs instructions of the program, and thereby operates in accordance with any of the embodiments described herein. For example, the processor 703 may determine if a red line score has been reached based on a refresh request from a client.

The main memory 704 may comprise any type of memory for storing data, such as, but not limited to, a flash driver, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 704 may comprise a plurality of memory modules.

As used herein, information may be "received" by or "transmitted" to, for example: (i) the apparatus 700 from another device; or (ii) a software application or module within the apparatus 700 from another software application, module, or any other source.

In some embodiments, the storage device 705 stores a database (e.g., including information associated with a cache entity). Note that the database described herein is only an example, and additional and/or different information may be stored therein. Moreover, various databases might be split or combined in accordance with any of the embodiments described herein.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Moreover, while embodiments have been illustrated using particular types of tables and databases, embodiments may be implemented in any other of a number of different ways. For example, some embodiments might be associated with publically available information, such as flight or train schedules available via web sites.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method comprising:
   receiving, at a cache entity, a first refresh request associated with a particular resource from a first unique client;
   determining, via a processor, that the first refresh request associated with the particular resource from the first unique client does not indicate a defective copy of the particular resource at the cache entity based on determining that the first refresh request does not meet a predetermined number of refreshes coming from a predetermined number of unique clients;
   receiving, at a cache entity, a second refresh request associated with the particular resource from a second unique client;
   determining, via the processor, that the first refresh request associated with the particular resource from the first unique client and the second refresh request associated with the particular resource from the second unique client indicates a defective copy of the particular resource at the cache entity based on determining that the first refresh request and the second refresh request meet the predetermined number of refreshes coming from the predetermined number of unique clients;
   in response to the predetermined number of refreshes coming from the predetermined number of unique clients being met, reloading the particular resource from a server; and
   storing the reloaded resource at the cache entity.

2. The method of claim 1, wherein the determining that the first refresh request associated with the particular resource from the first unique client and the second refresh request associated with the particular resource from the second unique client meets the predetermined number of refreshes is further based on exceeding a reliability score associated with the particular resource.

3. The method of claim 2, wherein the reliability score is incremented based on a number of received refresh requests.

4. The method of claim 3, wherein the first refresh request is weighted based on the first unique client transmitting the first refresh request and the second refresh request is weighted based on the second unique client transmitting the second refresh request.

5. The method of claim 2, wherein the reliability score associated with the particular resource is based on an up-time of the server.

6. The method of claim 1, wherein the first refresh request comprises an HTTP GET request, and wherein the HTTP GET request comprises a field indicating that the first request is a refresh.

7. The method of claim 1, wherein the reloaded resource is replaced at the cache entity prior to an end of a cache entity time-out period.

8. The method of claim 1, wherein the defective copy comprises an incomplete copy of the particular resource.

9. The method of claim 1, wherein the defective copy comprises an incorrect copy of the particular resource.

10. A non-transitory computer-readable medium comprising instructions that when executed by a processor perform a method, the method comprising:
    receiving, at a cache entity, a first refresh request associated with a particular resource from a first unique client;
    determining, via a processor, that the first refresh request associated with the particular resource from the first unique client does not indicate a defective copy of the particular resource at the cache entity based on determining that the first refresh request does not meet a predetermined number of refreshes coming from a predetermined number of unique clients;
    receiving, at a cache entity, a second refresh request associated with the particular resource from a second unique client;
    determining, via the processor, that the first refresh request associated with the particular resource from the first unique client and the second refresh request associated with the particular resource from the second unique client indicates a defective copy of the particular resource at the cache entity based on determining that the first refresh request and the second refresh request meet the predetermined number of refreshes coming from the predetermined number of unique clients;
    in response to the predetermined number of refreshes coming from the predetermined number of unique clients being met, reloading the particular resource from a server; and
    storing the reloaded resource at the cache entity.

11. The medium of claim 10, wherein the determining that the first refresh request associated with the particular resource from the first unique client and the second refresh request associated with the particular resource from the second unique client meets the predetermined number of refreshes is further based on exceeding a reliability score associated with the particular resource.

12. The medium of claim 11, wherein the reliability score is incremented based on a number of received refresh requests.

13. The medium of claim 12, wherein the first refresh request is weighted based on the first unique client transmitting the first refresh request and the second refresh request is weighted based on the second unique client transmitting the second refresh request.

14. The medium of claim 11, wherein the reliability score associated with the particular resource is based on an up-time of the server.

15. The medium of claim 10, wherein the first refresh request comprises an HTTP GET request, and wherein the HTTP GET request comprises a field indicating that the first request is a refresh.

16. An apparatus comprising:
a processor;
a non-transitory computer-readable medium comprising instructions that when executed by the processor perform a method, the method comprising:
receiving, at a cache entity, a first refresh request associated with a particular resource from a first unique client;
determining, via the processor, that the first refresh request associated with the particular resource from the first unique client does not indicate a defective copy of the particular resource at the cache entity based on determining that the first refresh request does not meet a predetermined number of refreshes coming from a predetermined number of unique clients;
receiving, at a cache entity, a second refresh request associated with the particular resource from a second unique client;
determining, via the processor, that the first refresh request associated with the particular resource from the first unique client and the second refresh request associated with the particular resource from the second unique client indicates a defective copy of the particular resource at the cache entity based on determining that the first refresh request and the second refresh request meet the predetermined number of refreshes coming from the predetermined number of unique clients;
in response to the predetermined number of refreshes coming from the predetermined number of unique clients being met, reloading the particular resource from a server; and
storing the reloaded resource at the cache entity.

17. The apparatus of claim 16, wherein the determining that the first refresh request associated with the particular resource from the first unique client and the second refresh request associated with the particular resource from the second unique client meets the predetermined number of refreshes is further based on exceeding a reliability score associated with the particular resource.

18. The apparatus of claim 17, wherein the reliability score is incremented based on a number of received refresh requests.

19. The apparatus of claim 18, wherein the first refresh request is weighted based on the first unique client transmitting the first refresh request and the second refresh request is weighted based on the second unique client transmitting the second refresh request.

20. The apparatus of claim 17, wherein the reliability score associated with the particular resource is based on an up-time of the server.

* * * * *